Jan. 27, 1959
H. F. GOODMAN
2,871,036
PACKED SCREW-THIMBLE TYPE COUPLING WITH
MEANS TO PREVENT OVERCOMPRESSION
OF THE PACKING
Filed July 26, 1954
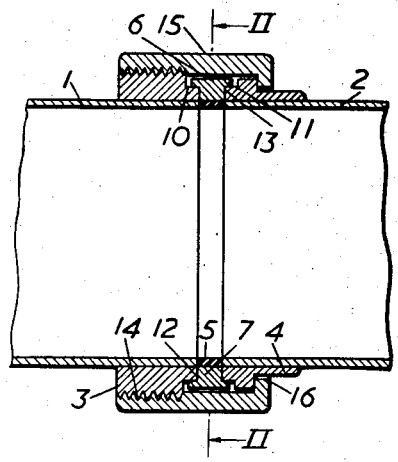
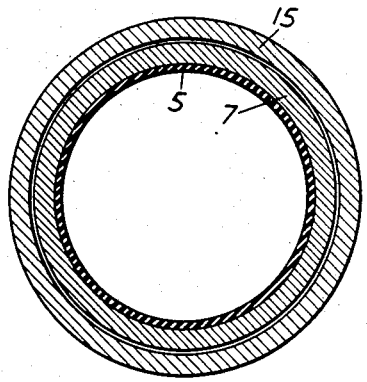
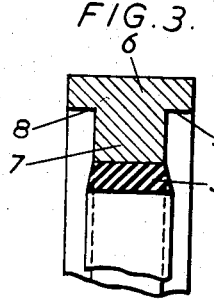 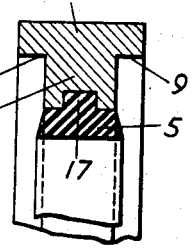
Inventor
HUGH FREDERICK GOODMAN
By *Young, Emery*
*& Thompson*
Attorneys

United States Patent Office 2,871,036
Patented Jan. 27, 1959

2,871,036

PACKED SCREW-THIMBLE TYPE COUPLING WITH MEANS TO PREVENT OVERCOMPRESSION OF THE PACKING

Hugh Frederick Goodman, London, England, assignor to The A. P. V. Company Limited, London, England Application July 26, 1954, Serial No. 445,633

Claims priority, application Great Britain November 20, 1953

2 Claims. (Cl. 285—354)

This invention relates to fluid-tight connections or unions for pipes such as are required between pipe line sections or between a pipe line and a piece of apparatus; such connections being referred to hereinafter as pipe connections.

More particularly the invention is concerned with such connections wherein a resiliently deformable sealing component having an opening corresponding to the bore diameter of the pipes is interposed between the end faces of the pipes to be connected, the sealing component being secured to a surrounding rigid component which prevents the sealing component from spreading radially outwards when the end faces of the pipes are drawn towards one another in the making of the connection.

The main object of this invention is to provide an improved arrangement which will enable the sealing component to be easily fitted in the proper relationship to the bore of the pipes to be connected and which will ensure that the sealing component will, when the connection is made, form a substantially smooth continuation of the bore of the pipes.

According to the present invention, the component and the ends of the pipes (or the end fittings secured thereto) are formed so to be located to one another as to hold the bores of the pipes and the opening in the sealing component co-axial, and in addition the confining component is arranged to form a rigid abutment between the ends of the pipes or the end fittings so as to limit the movement of the end faces of the pipes towards one another.

Thus, with such an arrangement, it can be ensured that in the limiting position the compression of the sealing member is such that the wall of its opening, held co-axially with the bores of the pipes, shall form a substantially smooth continuation of the bore of the pipes.

Most usually the confining and sealing members will be in the form of rings one about the other, and the transverse location is afforded by cylindrical surfaces formed on the ends of the pipes (or their end fittings) co-axially with the bores and on the confining ring co-axially with the opening in the sealing ring; in such a case the confining ring would also have a circular flange to constitute the rigid abutment.

The sealing ring, or at least that part thereof projecting radially inwards from the confining ring, will preferably be of dovetail or similar shape in cross section so that the side margins of the ring adjacent the bore therethrough are first engaged during clamping of the conduits or pipe sections.

The sealing component which would be of rubber or like material can be secured to the confining component either by being bonded to it or by forming the two components with parts to interlock mechanically on assembling the components.

The invention is illustrated in the accompanying drawing in which Figure 1 is a longitudinal section of a pipe connection and Figure 2 is a section on the line II—II Figure 1; Figure 3 is a detail section to a larger scale of the confining and sealing ring and Figure 4 is a view similar to Figure 3 and showing a modified construction.

Referring to the drawings, the two pipes are connected and indicated at 1, 2, these pipes having secured to their ends end fittings or sleeves 3, 4. A fluid-tight seal is made between the end faces of the pipes 1, 2 by a sealing component in the form of a ring 5 of resilient material, this ring 5 having an opening corresponding to the bore of the pipes.

This ring 5 is secured to a confining component in the form of a metal ring 6 which is co-axial with the ring 5 and its opening.

The confining ring 6 is of metal of T-cross section so providing cylindrical locating surfaces 8, 9 co-axial with the ring, and these surfaces fit snugly on cylindrical surfaces 10, 11 which are formed on the sleeves 3, 4 co-axial with the bores of the pipes 1, 2.

Thus, by reason of the co-axial relationship of the cylindrical surfaces 8, 9 to the opening in the sealing ring 5 and the co-axial relationship of the cylindrical surfaces 10, 11 on the end fittings to the bore of the pipes 1, 2, it is ensured that the opening and the bores of the pipes shall be in proper register.

The stem 7 of the T-section forms a circular flange which is interposed between the end faces 12, 13 of the end fittings 3, 4 and so sets a limit to the extent to which the end faces of the pipes can be drawn towards one another; this in its turn sets a limit to the extent to which the sealing ring 5 can be compressed and caused thereby to expand radially inwards, and the parts would be so proportioned that when the pipes are drawn towards one another to the limit, the wall of the opening in the sealing ring will form a substantially smooth continuation of the bore of the pipes 1, 2 with which bore the opening is already held co-axially.

In Figures 1 and 2 is illustrated one arrangement for drawing the end faces of the pipes 1 and 2 towards one another and into sealing engagement with the sealing ring 5, the arrangement consisting in forming the sleeve 3 with a screw thread 14 engaged by a screw thread on a hollow sleeve 15 flanged at 16 to pull against a flange on the other sleeve 4.

The sealing ring is of dovetailed cross-section so that when the end faces of the pipes 1, 2 are drawn towards one another the parts of the side faces of the sealing ring adjacent the wall of the opening therein will first be engaged.

The sealing ring 5 can be secured to the confining ring 6 by being bonded thereto, or as is shown in Figure 4 one of the rings (as shown the ring 5) can have a peripheral rib 17 entering a corresponding recess in the other ring (as shown in the ring 6) so as to provide a mechanical interlock when the two rings are assembled.

While the one piece construction of the ring 6 is preferred, it would be possible to have a two part ring, one part corresponding to the cross limb of the T and the other corresponding to the stem of the T.

Where as is shown the part to be connected comprises a metal pipe 1 or 2 having secured to it an end fitting such as a sleeve 3 or 4, by expanding the pipe to grip the bore of the end fitting the sealing ring would be dimensioned diametrally to be engaged only by the finished end face of the tube, i. e. not by any part of the end fitting; this forms the seal within the diameter of the end fitting and so the seal of the bore of the tube is not affected by any distortion or irregularity of the end fitting.

While the connector of this invention can be generally applied it is especially suitable for use where liquids for human consumption (e. g. milk, fruit juices, wines and so on) are to be conveyed, the absence of crevices and the smooth bore preventing or minimising lodgement of solid particles or bacteria, and so reducing the number of occasions on which the pipes have to be dismantled for thorough cleaning.

It is to be noted that the confining ring 6 by extending radially inwards between the faces 12, 13 almost completely confines the sealing ring against any displacement whatever outwards away from the end faces of the pipes while they are being drawn towards one another, this resulting in providing an efficient fluid-tight seal.

What I claim is:

1. In combination, two pipes, means to draw the ends of the two pipes towards one another including an annular flange fitting surrounding one pipe at its end, an annular-threaded fitting surrounding the other pipe at its end, and an internally-threaded sleeve flanged at one end surrounding the fittings, a resiliently deformable sealing component in the form of a ring which is interposed between the end faces of the pipe ends and has a circular flow opening corresponding substantially to the bore of the pipe ends and an external diameter corresponding substantially to the external diameter of the pipe ends, and a rigid confining component substantially T-shaped which is secured to and surrounds the sealing component to prevent it spreading radially outwards, the end faces of the fittings being coplanar with the end surfaces of the respective pipes and forming abutment surfaces, and the exterior surfaces of the fittings having a portion of reduced diameter immediately adjacent their ends, concentric with their axes, said confining component having the web portion of the T extending axially from each side of the stem and of an internal diameter to receive the portions of the fittings of reduced diameter to hold the bore of the pipe ends and the opening in the sealing component coaxial, the stem portion of the T of the confining component forming also an abutment between the abutment surfaces at the ends of the fittings to limit the movement of the pipe ends towards one another, said resiliently deformable sealing component being dovetail in transverse cross section and forming a continuation of the stem portion of the T, the abutment and abutment surfaces being arranged so as to limit the compression of the sealing component between the pipe ends to prevent the sealing component spreading radially inwards.

2. The pipe connection as set forth in claim 1, wherein the resilient sealing component is attached to the stem of the rigid T-shaped component by means of a peripheral rib on one of said components entering a corresponding recess in the other one of said components.

References Cited in the file of this patent
UNITED STATES PATENTS

| | | |
|---|---|---|
| 599,558 | Greenfield | Feb. 22, 1898 |
| 695,174 | Roller | Mar. 11, 1902 |
| 1,035,810 | Osborne | Aug. 13, 1912 |
| 1,965,273 | Wilson | July 3, 1934 |
| 2,195,003 | Danvers | Mar. 26, 1940 |
| 2,291,709 | Goetze | Aug. 4, 1942 |
| 2,341,449 | Krone | Feb. 8, 1944 |
| 2,374,138 | Sanford | Apr. 17, 1945 |
| 2,455,982 | Dowty | Dec. 14, 1948 |
| 2,513,178 | Jackson | June 27, 1950 |
| 2,520,089 | Lippincott | Aug. 22, 1950 |

FOREIGN PATENTS

| | | |
|---|---|---|
| 513,501 | Belgium | Aug. 30, 1952 |